United States Patent [19]
Hara et al.

[11] 3,955,809
[45] May 11, 1976

[54] SPIRAL SPRING FOR INSTRUMENTS

[75] Inventors: Kuniyoshi Hara; Junichi Honda, both of Kobe, Japan

[73] Assignee: Mitsubishi Denki Kabushiki Kaisha, Tokyo, Japan

[22] Filed: May 23, 1974

[21] Appl. No.: 472,843

[52] U.S. Cl. .............................. 267/156; 267/160
[51] Int. Cl.² ........................................... F16F 1/12
[58] Field of Search .......... 267/156, 155, 150, 160, 267/166

[56] References Cited
UNITED STATES PATENTS

| | | | |
|---|---|---|---|
| 3,550,928 | 12/1970 | Antritter | 267/156 |
| 3,635,313 | 1/1972 | Hettich | 267/160 |
| 3,817,508 | 6/1974 | Bergstrom et al. | 267/160 |

*Primary Examiner*—James B. Marbert
*Attorney, Agent, or Firm*—Oblon, Fisher, Spivak, McClelland & Maier

[57] ABSTRACT

A spiral spring arrangement consists essentially of two spiral springs. The spring arrangement comprises an immovable member, a rotatable shaft, and a rotatively movable member. One of the spiral springs has one end connected to the immovable member and the other end to the rotatable shaft. The other spiral spring has one end connected to the rotatable shaft and the other end to the rotatively movable member. The rotatably movable member serves as the point acting on the spiral springs. The two spiral springs are in a serial relationship, thus reducing the spring constant against rotation.

13 Claims, 10 Drawing Figures

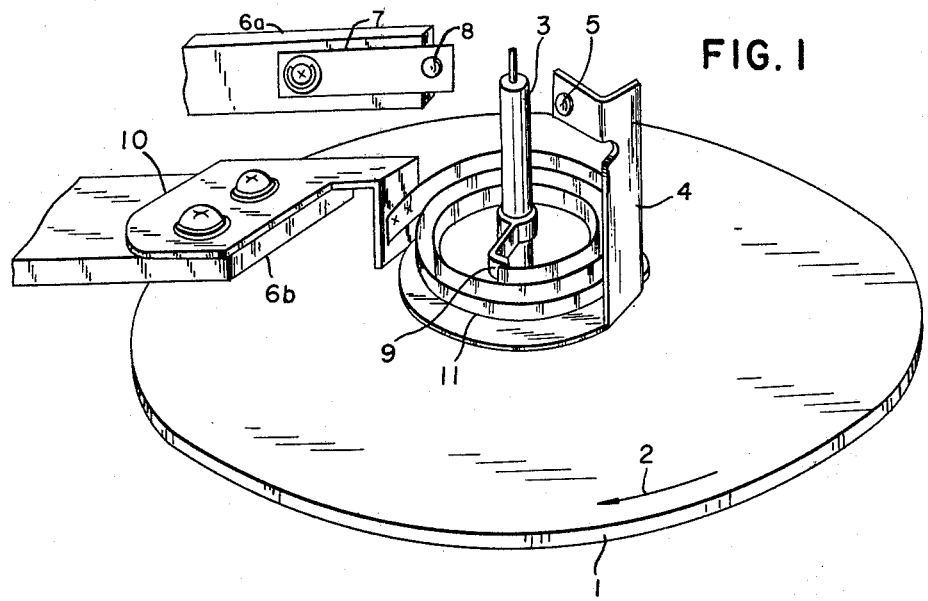
FIG. 1
FIG. 2
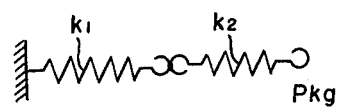
FIG. 3
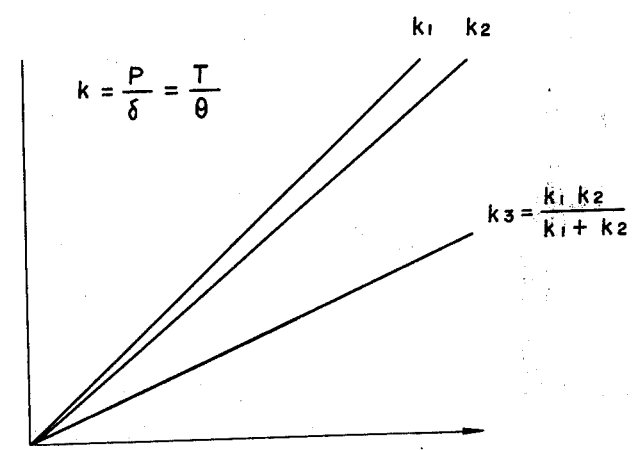

SPIRAL SPRING FOR INSTRUMENTS

BACKGROUND OF THE INVENTION

1. Field of the Invention

The present invention relates to a spiral spring arrangement useful for general measuring instruments, and, more particularly, to a spiral spring arrangement using two spiral springs.

2. Description of the Prior Art

A known spiral spring arrangement for instrument use such as, for example, a damping spring for induction disk type relays, has hitherto been constituted essentially of one spiral spring having its outer end connected to the frame work of the relay, and its inner end connected to the rotating shaft of the induction disk.

The damping spring plays an important role in determining the starting point of a relay, and is often used, for example, to set the operating point of a relay. In order to realize a high-sensitivity relay, the damping torque of the spiral spring used must be sufficiently small. It is desirable that this small damping torque be determined to be an arbitrary value over a wide range when sensitivity adjustment is needed. To this end, the spring constant should be reduced by suitably determining the cross-sectional geometry and the material of the spring, and the winding angle on the spring should be arbitrarily determined over a wide range. Presently, however, the prior art is unable to provide a spiral spring arrangement permitting adjustment of sufficiently small damping torque over a wide range because the spring constant cannot further be reduced by simply modifying the cross-sectional geometry of the spring or by choosing the material of the spring. From an electrical point of view, there are limitations on the use of a spiral spring as a current path. If a satisfactory spring constant could be achieved by sufficiently thinning the spring strip and reducing the cross section thereof, the spring will be mechanically weak and so delicate that extra care is required when it is handled or installed in position. In addition, because the spring is too thin, the angular displacement cannot easily be modified for sensitivity adjustment for the associated relay. Furthermore, such a weak spring is very liable to become extended or entangled even by faint vibration with the result that the spring loses its normal function and introduces various undesirable effects into the associated instrument.

SUMMARY OF THE INVENTION

It is an object of the invention to provide a spiral spring arrangement used for instruments which is small in spring constant, large in mechanical strength, and permits easy handling and mounting.

It is another object of the invention to provide a spiral spring arrangement used for instruments the damping torque of which can be easily adjusted and precisely set to the desired value.

Other objects will appear hereinafter.

These and other objects are achieved by the present invention consisting of a spiral spring arrangement for an instrument comprised essentially of a first and a second spiral spring wherein the first spiral spring has one end connected to a pivotally supported member, and the other end to the movable part of an instrument, and the second spiral spring has one end connected to the pivotally supported member, and the other end to an immovable member. The spiral spring arrangement of the invention is further characterized in that one end of the first spiral spring is secured to a rotating shaft by way of a first annular fastener semi-rotatably fitted on the rotating shaft, and one end of the second spiral spring is connected to the rotating shaft by way of a second annular fastener semi-rotatably fitted on the rotation shaft independent of the first annular fastener.

BRIEF DESCRIPTION OF THE DRAWINGS

The foregoing and other objects of the present invention will be more fully appreciated as the same becomes better understood from the following detailed description of preferred embodiments when considered in connection with the accompanying drawings, in which:

FIG. 1 is a perspective view showing an essential part of a prior art induction disk type relay, FIG. 2 is a diagram showing two serially linked springs, FIG. 3 is a graphic diagram showing the relation between the unit of two serially linked springs and two individual springs as in FIG. 2 with respect to torque and angular displacement.

DESCRIPTION OF THE PREFERRED EMBODIMENTS

Figure 4:
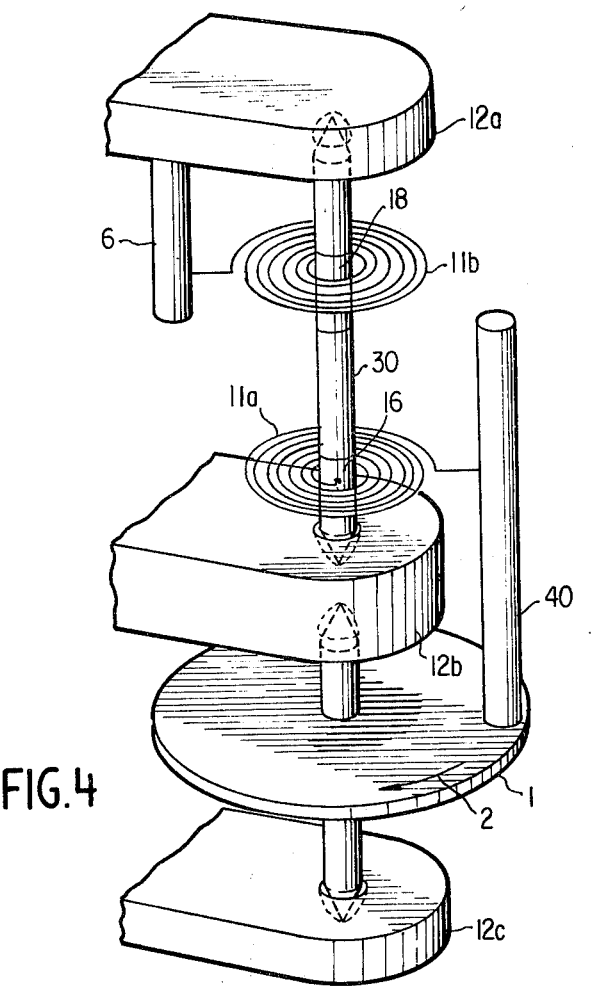
FIG. 4 is a perspective view showing the concept of the invention by way of example.

With reference now to FIG. 1, there is shown a perspective view of an essential part of an induction disk type relay with a prior art spiral spring. An induction disk 1 receives a driving torque from a drive part (not shown) and rotates in the direction of an arrow 2. A rotating shaft 3 is in the center of the disk 2 and rotates with the disk 2. A movable contact arm 4 is rotated in the same direction as the disk 2. A movable contact 5 is installed at the other end of the arm 4. A fixed contact arm 7 is connected to a fixed part 6a which is part of the frame work of the relay. A fixed contact 8 is installed at the end of the arm 7. The inner end of a spiral spring 11 is fastened to a stopper 9 connected to the rotating shaft 3. The outer end thereof is connected to a stopper 10 which is fastened to a fixed part 6b which is part of the frame work of the relay. Thus the spiral spring 11 is wound as the induction disk 1 rotates in the direction 2.

Assume that a driving torque is applied from the drive part to the induction disk 1 in the direction 2. If the driving torque is larger than the damping torque of the spiral spring 11, the induction disk 1 is rotated in the direction 2 and the movable contact 5 contacts the fixed contact 8. As a result, a current path is formed through stopper 10, spiral spring 11, stopper 9, movable contact arm 4, movable contact 5, fixed contact 8 and fixed contact arm 7 and the relay is actuated.

When the relay is actuated, the spiral spring 11 offers a certain constant damping torque against the driving torque of the induction disk 1 whereby the starting point of the relay is determined. After the relay is operated, a negative torque proportional of the rotating angle of the spring 11 is applied to the induction disk 1 whereby the rotation of the disk 1 is braked.

FIGS. 2 and 3 are diagrams useful for illustrating the principles of serially combined springs which feature this invention. FIG. 2 schematically shows two serially linked helical tension springs whose springs constants are $k_1$ and $k_2$ respectively. As well-known, in this type of spring, the tensile load P (kg) is equal to the elongation $\delta$ (m). Therefore the serially linked springs assume linear gradients $k_1$ and $k_2$ respectively, as shown in FIG. 3. The relationship between the spring constant $k_3$ of the combined serial springs and the spring constants $k_1$ and $k_2$ of the individual springs is expressed as $$k_3 = \frac{k_1 \cdot k_2}{k_1 + k_2} \quad (1)$$

$$k_1 - k_3 = \frac{k_1^2}{(k_1 + k_2)k_1} > 0 \quad (2)$$

$$k_2 - k_3 = \frac{k_2^2}{(k_1 + k_2)k_2} > 0 \quad (3)$$

The combined spring constant $k_3$ is smaller than each of spring constants $k_1$ and $k_2$, as shown in Eqs. (2) and (3). Accordingly, the combined springs assume a linear characteristic with a gradient smaller than that of each of the two springs having spring constants $k_1$ and $k_2$. If the spring constants $k_1$ and $k_2$ are the same, the spring constant of the serially combined springs is half that of each of the individual springs as indicated in Eq. (1).

Generally, the combined spring constant of two helical springs which are serially connected to each other is smaller than that of each of the two helical springs. Thus, by combining two helical springs, the spring constant can be reduced without resorting to modifying the sectional geometry and the material used for the spring.

The combined characteristic of two helical springs as described by referring to FIGS. 2 and 3 can be similarly obtained in two serially linked spiral springs used according to the invention. In a spiral spring, the relationship, $T = K\theta$, holds between the rotating torque T (kg.m) and the angular displacement $\theta$ (rad.). Assume that the spring constants of two independent spiral springs are $k_1$ and $k_2$ respectively and the combined spring constant of the two springs connected in series to each other is $k_3$. The relationship between these spring constants is given as follows.

$$k_3 = \frac{k_1 \cdot k_2}{k_1 + k_2} \quad (4)$$

Equation (4) shows that the spring constant $k_3$ of the serially combined spiral springs is smaller than each of the spring constants $k_1$ and $k_2$ of the individual springs.

FIG. 4 is a perspective view showing an embodiment of the invention based on the principle of serially combined spiral springs as in Eq. (4). A movable disk 1 corresponding to the induction disk of a relay is rotated in the direction of an arrow 2 by a drive source (not shown). A first rotating shaft 3 is connected to the movable disk 1 and rotated with the disk 1. The rotating shaft 3 is pivotally supported by an intermediate bearing 12b and a lower bearing 12c. A second rotating shaft 30 is pivotally supported by an upper bearing 12a and the intermediate bearing 12b and is positioned coaxially with the first rotating shaft. A first spiral spring 11a and a second spiral spring 11b, being mutually reversely coiled, have their inner ends connected to the second rotating shaft 30. The first spiral spring has its outer end connected to a first stopper 40 installed in the circumferential part of the movable disk 1. The second spiral spring has its outer end connected to a stopper 6 installed on the upper bearing 12a.

In this construction, when the movable disk 1 is given a driving torque and is rotated in the direction 2, the outer end of the first spiral spring 11a is wound by the second rotating shaft 30. This occurs because the two spiral springs are connected in series to each other. In other words, the spring constant of the serially combined spiral springs is smaller than that of each of the individual spiral springs. In FIG. 4, the reference numerals 16 and 18 denote components corresponding to fasteners as will be described later.

Figure 5:
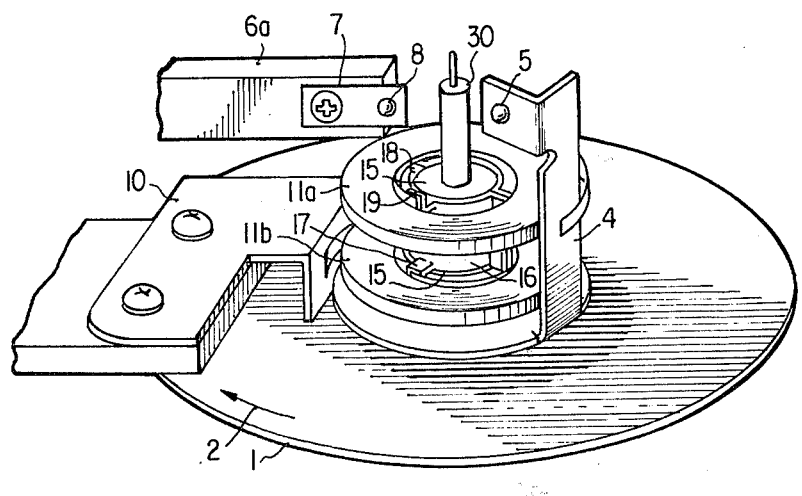
FIG. 5 is a perspective view showing an essential part of an induction disk type relay according to one embodiment of the invention in connection with the concept illustrated in FIG. 4.
Figures 6, 7:
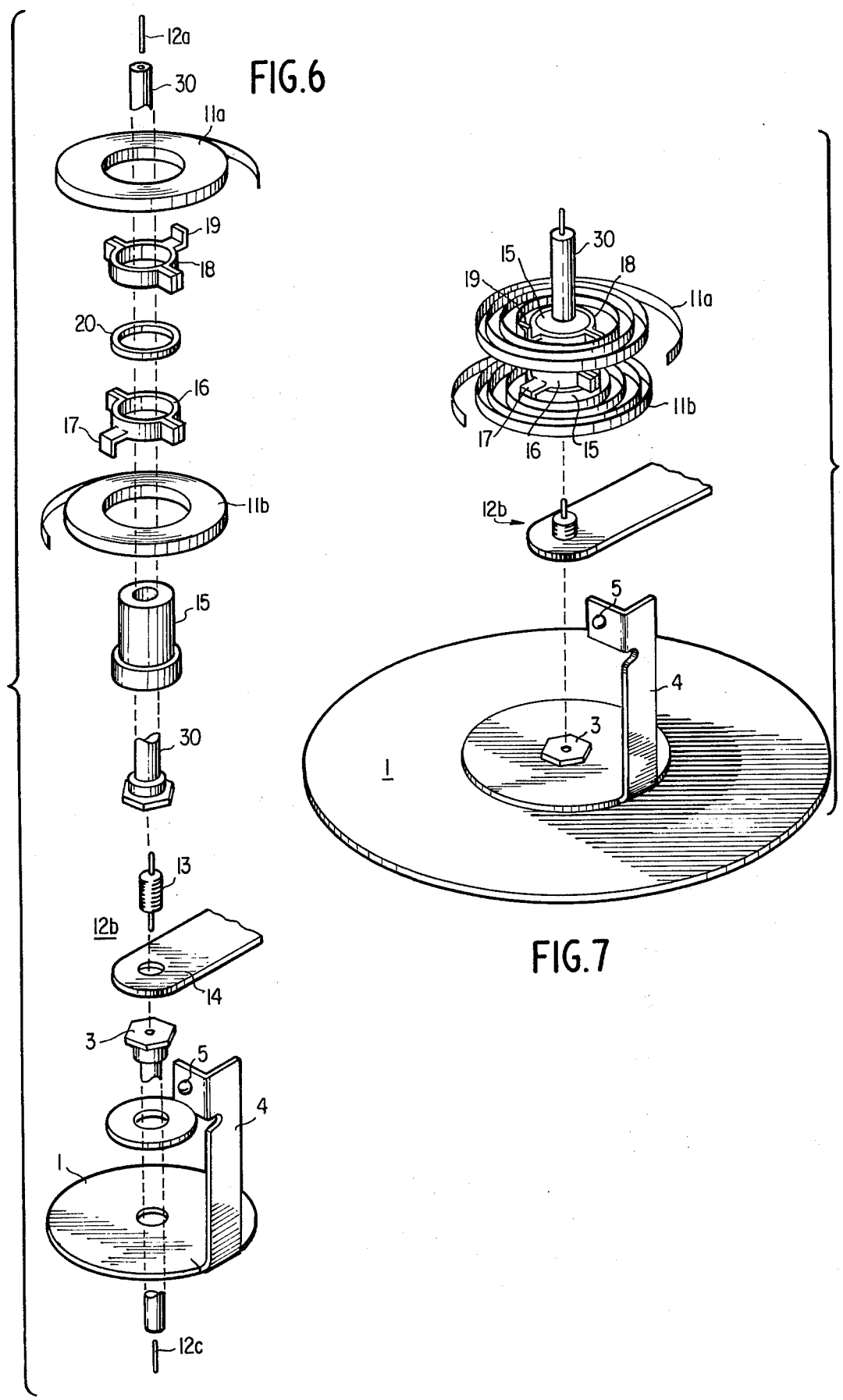
FIG. 6 is an exploded perspective view showing an essential part of the construction shown in FIG. 5.
FIG. 7 is a partial assembly diagram of the construction shown in FIG. 5.

FIG. 5 is a perspective view showing an essential part of an induction disk type relay incorporating the embodiment of the invention illustrated in FIG. 4. FIG. 6 is an exploded view thereof and FIG. 7 is a partial assembly diagram thereof. The invention will be described in more detail by referring to FIGS. 5 through 7. An intermediate bearing 12b is made up of a bearing element 13 and a supporting member 14. A second rotating shaft 30 is rotatably supported by the bearing element 13 and an upper bearing element 12a. rotating insulative hub 15 is fitted on the rotatng shaft 30. The inner end of a second spiral spring 11b is fastened to a second fastener 16 which is fitted on the hub 15. This fastener 16 is immovable against the rotating torque of the second spiral spring 11b but movable with finger tips. The fastener 16 has a lug 17 to which the inner end of the second spiral spring 11b is fastened. The inner end of the first spiral spring 11a is fastened to a first fastener 18 which is fitted on the hub 15. This fastener too is immovable against the rotating torque of the first spiral spring 11a but movable with finger tips. A washer 20 made of an insulating material is inserted between the first and second fasteners 18 and 16.

A first rotating shaft 3 is rotatably supported by the bearing element 13 and a lower bearing 12c. An induction disk 1 is fastened to the first rotating shaft 3. A movable contact arm 4 is installed on the induction disk 1 and a movable contact 5 is provided on the arm 4.

This spring arrangement comprising the first and second spiral springs linked in series to each other operates in the same manner as in the spring arrangement illustrated in FIG. 4

Figure 8:
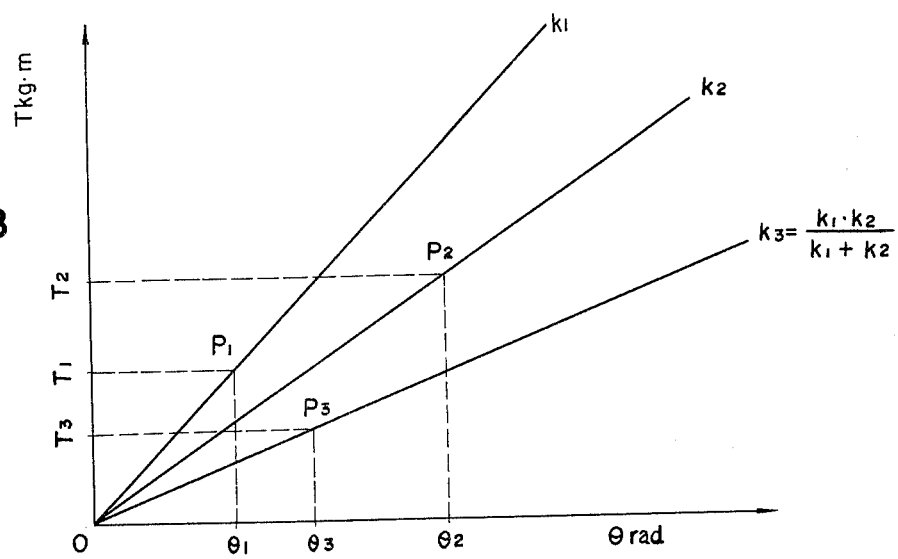
FIG. 8 is a graphic diagram for illustration in connection with the setting of an angular displacement on a spiral spring arrangement.

Another advantage of the invention resides in that the angular displacement can be adjusted independently on the first and second spiral springs 11a and 11b and set precisely to the desired values. This feature will be described by referring to FIGS. 4 and 8. Because, as described the first and second fasteners 16 and 18 are semi-rotatably fitted on the insulative hub 15, the angular displacement can be adjusted independently on the two spiral springs 11a and 11b. The angular displacement, once adjusted, is not varied by error during operation. The first and second fasteners 16 and 18 are adjusted so as to obtain points $P_1$ and $P_2$ on the spring constant gradients $k_1$ and $k_2$ of the springs 11a and 11b respectively as shown in FIG. 8. More specifically, the first fastener 16 is turned by $\theta_1$ (rad) counterclockwise to the position corresponding to point $P_1$ ($\theta_1$, $T_1$), with the rotating shaft 30 held immovable, so that the first spiral spring 11a (FIG. 4) is wound. Similarly, the second fastener 18 is turned clockwise to the position corresponding to point $P_2$ ($\theta_2$, $T_2$). Then the rotating shaft 30 is released. As a result, the rotating shaft 30 is rotated by the torque $T_3$ which is the difference between torques $T_2$ and $T_1$ to the position corresponding to the final point $P_3$ ($\theta_3$, $T_3$) along the linear gradient $k_3$. As in Eq. (1), the gradient $k_3$ depends on $k_1$ and $k_2$. Thus the relationship between the torque T and the angular displacement $\theta$ of the fastener is given as follows.

$$T_1 = k_1 \theta_1 \quad (5)$$

$$T_2 = k_2 \theta_2 \quad (6)$$

After releasing the rotating shaft 30, $$T_3 = T_2 - T_1 = k_3 \theta_3$$

$$(\text{where } k_3 = \frac{k_1 \cdot k_2}{k_1 + k_2}) \quad (7)$$

The final point $P_3$ ($\theta_3$, $T_3$) which depends on Eq. (7) signifies the following operation. The induction disk 2 is rotated in the direction 2 when a damping torque $T_3$ is applied to the disk 2 and if a driving torque $T_3$ is applied to the disk 2 and if a driving torque greater than $T_3$ and opposite to $T_3$ is applied to the disk 2. Because this damping torque, i.e., the initial value of torque, is equal to the difference between torques $T_2$ and $T_1$, and because the linear spring constant $k_3$ is a small gradient, even a very small initial value of torque can accurately be set on the spiral spring.

Table 1 below shows results of experiments on the spiral spring shown in FIG. 5 and on the spiral spring shown in FIG. 1 with respect to flexure in the vertical direction. The experimental spiral springs were of phosphor bronze in the shape of tape.

Figure 9:
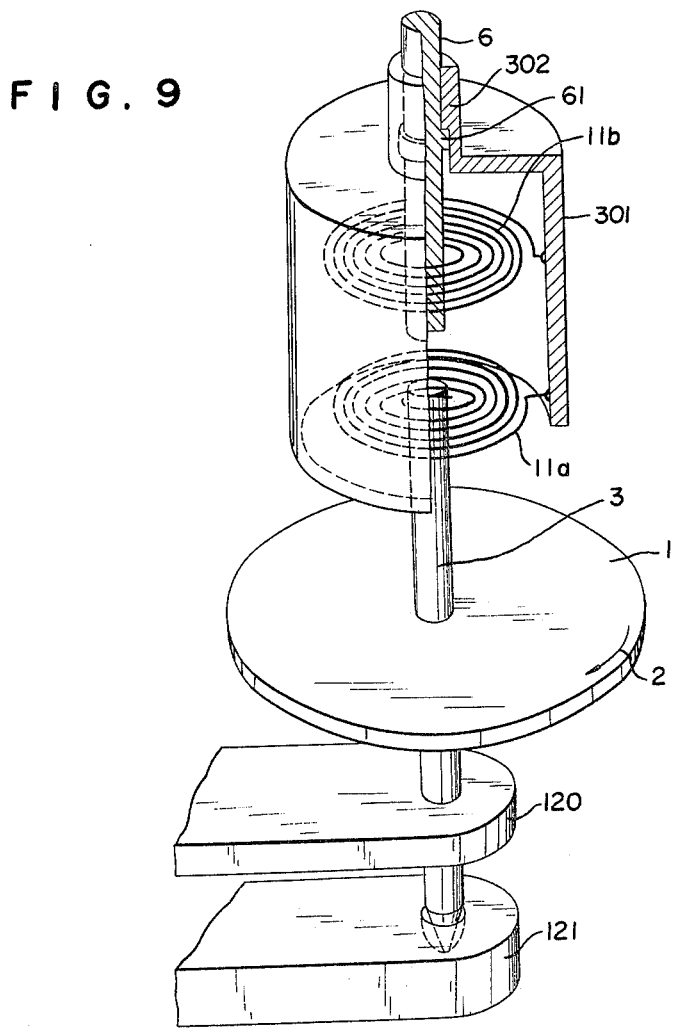
FIG. 9 is a perspective view conceptually showing another embodiment of the invention.

FIG. 9 is a partial sectional perspective view conceptually showing another embodiment of the invention. A movable disk 1 is fastened to a rotating shaft 3 which is rotatably supported by an intermediate bearing 120 and a lower bearing 121. A fixed part 6 in the shape of a shaft has a thrust bearing 61 by which a shaft body 302 of a cylindrical rotating body 301 is rotatably supported. Two spiral springs 11a and 11b which are oppositely coiled are accommodated in the rotating body 301. The first spiral spring 11a has its inner end connected to the rotating shaft 3 and the other end to the inner wall of the cylindrical rotating body 301. The second spiral spring 11b has its inner end connected to the fixed part 6 and its outer end to the inner wall of the cylindrical rotating body 301.

When the disk 1 is rotated in the direction 2, the first spiral spring 11a connected to the rotating shaft 3 is wound to cause the second spiral spring to be wound by rotating body 301. The two springs are so wound because these springs are serially linked to each other.

Figure 10:
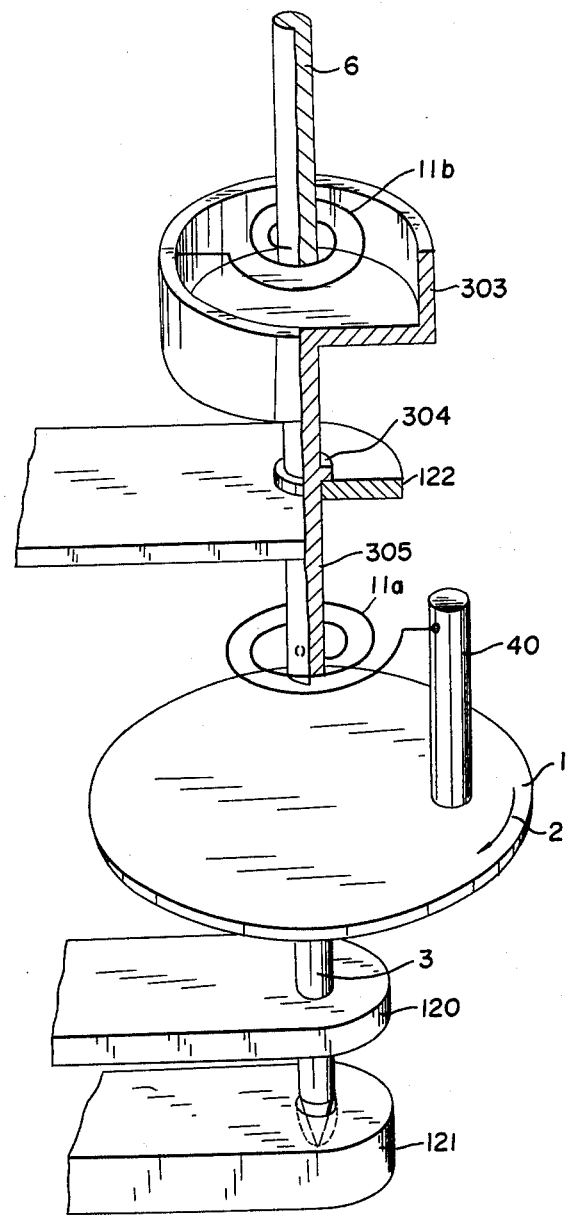
FIG. 10 is a partial sectional perspective view conceptually showing another embodiment of the invention.

FIG. 10 shows another embodiment of the invention by a partial sectional perspective view wherein a movable disk 1 having a stopper 40 is fastened to a first rotating shaft 3 which is rotatably supported by an intermediate bearing 120 and a lower bearing 121. A cylindrical body 303 having a second shaft 305 is rotatably supported by a thrust shaft part 304 installed on the second shaft 305 and by a thrust bearing 122. A first spiral spring 11a has its inner end connected to the second shaft 305 and its outer end to the stopper 40. A second spiral spring has its inner end connected to a shaft-shaped fixed part 6 and its outer end to the inner wall of the cylindrical body 303. It is noted that when the movable disk 1 is rotated in the direction 2, the first spiral spring 11a is not wound but unwound thereby imparting a rotating torque to the second shaft 305. This rotating torque is transmitted to the second spiral spring 11b by way of the cylindrical body 303. The torque from the cylindrical body 303 causes the second spiral spring to be wound. Thus, in the construction as in FIG. 10, the two spiral springs are linked in series to each other.

As will be evident from FIG. 10, the spiral direction of one spring may be either identical or opposite to that of the other because a rotating torque is produced regardless of whether the first spiral spring is wound or unwound from its natural balance position. In the same sense, the two spiral springs shown in FIGS. 4, 5 and 9 may be either in the same or in the opposite spiral direction.

TABLE 1

| | strength | thickness | width | length | percentage flexure |
|---|---|---|---|---|---|
| Spiral Spring (of prior art) | 0.8242 gcm/360° | 0.09mm | 0.64mm | 281mm | 100% |
| Spiral Spring (of invention) | 1.6388 gcm/360° | 0.125mm | 1.4mm | 96mm | 5.8% |

Table 1 shows that the combined strength according to the invention is 0.8194 gcm/360° being half that of a single spring because two spiral springs, each being 1.6388 gcm/360° in strength, are used in the construction according to the invention. This signifies that the spring strength is nearly the same in the spring structure of this invention and of the prior art. Thus, as indicated in Table 1, the percentage flexure is far better in the invention than in the prior art.

Although specific embodiments of the invention have been disclosed herein in detail, it is to be understood that this is for the purpose of illustrating the invention, and should not be construed as necessarily limiting the scope of the invention.

What is claimed as new and desired to be secured by Letters Patent of the U.S. is:

1. In an instrument having a movable part, a spiral spring arrangement comprising:

a rotatably supported rotatable body;

a first spiral spring having one end fastened to the rotatable body and the other end fastened to the movable part of the instrument; and a second spiral spring having one end fastened to the rotatable body and the other end to a fixed point of the instrument.

2. The combination recited in claim 1 wherein the rotatable body is a rotatable shaft.

3. The combination recited in claim 1 wherein means is provided for independently changing the positions where the first and second spiral springs are fastened to the rotatable body.

4. The combination recited in claim 2 wherein one end of the first spiral spring is fastened to the rotatable shaft by a first annular fastener which is semi-rotatably fitted on the rotatable shaft and one end of the second spiral spring is fastened to the rotatable shaft by a second annular fastener which is semi-rotatably fitted on the rotatable shaft independent of the first annular fastener.

5. The combination recited in claim 1 wherein the first spiral spring has its inner end fastened to the rotatable body and its outer end fastened to the movable part of the instrument and the second spiral spring having its inner end fastened to the rotatable body and its outer end fastened to a fixed point of the instrument.

6. The combination recited in claim 1 wherein the first and second spiral springs are coiled in the same direction.

7. The combination recited in claim 1 wherein the first and second spiral springs are coiled in directions opposite to each other.

8. The combination recited in claim 1 wherein the first spiral spring has its inner end fastened to the movable part of the instrument and its outer end fastened to the rotatable body and the second spiral spring has its inner end fastened to a fixed point and its outer end fastened to the rotatable body.

9. The combination recited in claim 8 wherein means is provided for independently changing the positions where the first and second spiral springs are fastened to the rotatable body.

10. In an instrument having a movable part, a spiral spring arrangement comprising: a rotatably supported cylindrical body; a first spiral spring housed in the cylindrical body and having its outer end fastened to the cylindrical body and its inner end fastened to the movable part of the instrument; and a second spiral spring housed in the cylindrical body and having its outer end fastened to the cylindrical body and its inner end fastened to a fixed point of the instrument.

11. The combination recited in claim 10 wherein means is provided for independently changing the positions where the first and second spiral springs are fastened.

12. In an instrument having a movable part, a spiral spring arrangement comprising:

a rotatably supported shaft having a cylindrical part;

a first spiral spring having its inner end fastened to the rotatable shaft and its outer end fastened to the movable part of the instrument; and a second spiral spring housed in the cylindrical part and having its outer end fastened to the cylindrical part and its inner end fastened to a fixed point of the instrument.

13. The combination recited in claim 12 wherein means is provided for independently changing the positions where the first and second spiral springs are fastened.

* * * * *